May 6, 1958  F. J. TELGMANN  2,833,048
PLUG GAUGES HAVING GLASS GAUGING SURFACES
Filed March 18, 1955
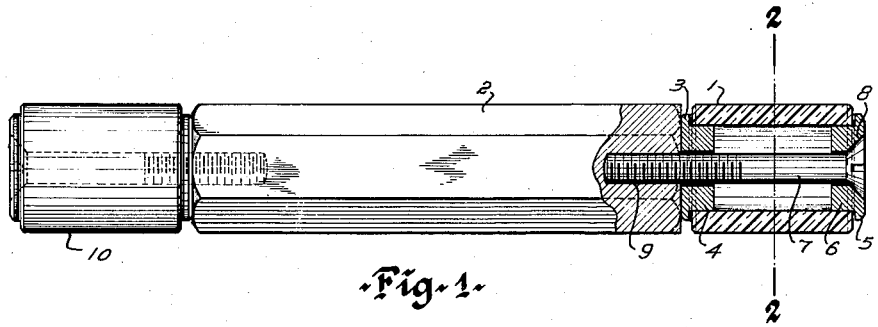
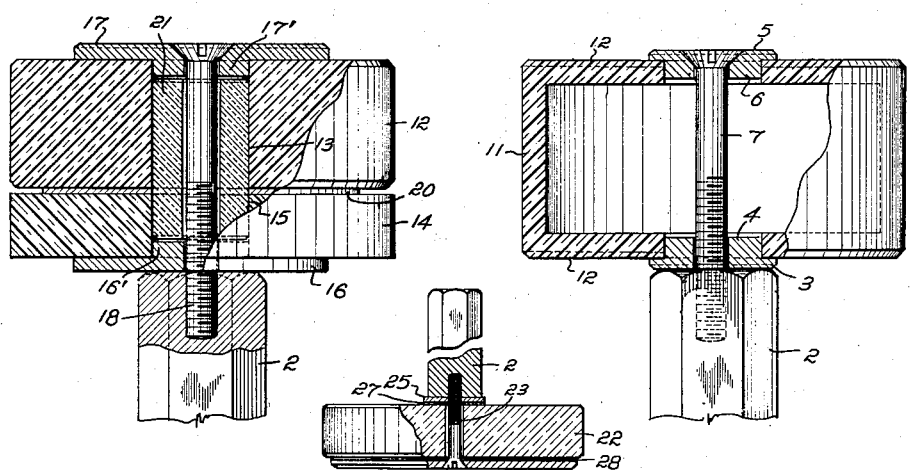
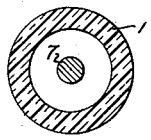
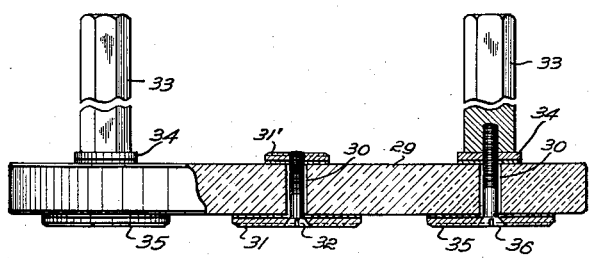
INVENTOR.
Frederick J. Telgmann
BY Alex. E. MacRae
Attorney.

2,833,048

PLUG GAUGES HAVING GLASS GAUGING SURFACES

Frederick J. Telgmann, Kingston, Ontario, Canada, assignor to Canadian Size Control Company Limited, Kingston, Ontario, Canada Application March 18, 1955, Serial No. 495,315

2 Claims. (Cl. 33—178)

This invention relates to plug gauges.

It has heretofore been proposed to employ, in plug gauges, a non-metallic gauging member such as glass. However, although such gauges have great practical advantages, they are not in general commercial use largely because, it is believed, no commercially acceptable structural form has been provided.

It is an object of this invention to provide a plug gauge having a glass gauging member and means for effectively and readily mounting said member upon or dismounting from a handle or support.

The invention will be described with reference to the accompanying drawing, in which Figure 1 is a side elevation, partly in section, of a plug gauge in accordance with the invention, Figure 2 is a section on line 2—2 of Figure 1, and Figure 3 to 6, inclusive, are sectional elevations of various modified forms of gauges.

Referring to Figures 1 and 2, 1 is a gauging member and comprises a tube formed of glass, preferably borosilicate. The glass tube may be produced from standard commercially available glass tubing.

Means for mounting the gauging member 1 on a handle 2 comprises a back plate 3 having an axial projection 4 arranged to snugly enter one end of tube 1 and a front plate 5 having an axial projection 6 arranged to snugly enter the other end of tube 1. A screw 7 is arranged to extend through axial bores in plates 3 and 5, the latter plate having a seat 8 for the screw head. The handle 2 is axially tapped at 9 for screw-threaded engagement with the screw.

It will be observed that the step of assembling the mounting parts 3, 5 and 7 is extremely simple and that the step of mounting the tube 1 on handle 2 may be carried out quickly and conveniently. Moreover, replacement of the tube 1 or reversal of its position on the handle may be easily effected. An important feature of this modification of the invention is that the tube 1 remains hollow in actual operation, i. e., no filling or packing is required.

As illustrated in Figure 1, the gauge may be of the double end type wherein the gauging member 1 is a go gauge and a second gauging member 10, mounted on the other end of handle 2 in the same manner, is a no go gauge.

The hollow glass tube type of gauge as described is particularly advantageous in diameters of, say, ¼" to 2½".

Figure 3 illustrates a type of gauging member 11 which is suitable for larger diameter gauges. As shown, the glass member 11 is of hollow cylindrical form having end walls 12 each of which is provided with an axial opening 13 to receive a respective plate 3 or 5 of the mounting means, which is similar to that shown in Figure 1. The member 11 remains hollow in use, no packing or filling being required.

Figure 4 is also illustrative of a larger diameter gauge wherein 12 is a go gauging member formed of plate or like glass. Member 12 is in effect a thick-walled glass tube, 13 being the axial opening therethrough. A no go gauging member 14 is preferably associated with member 12 and is generally similar to member 12 but is of somewhat less axial length. The axial opening therethrough is indicated at 15. The members 12 and 14 are assembled and mounted on handle 2 by means of a back plate 16, front plate 17, and screw 18. Member 14 is arranged adjacent back plate 16 which has an axial projection 16' for reception in opening 15. Member 12 is thus arranged adjacent front plate 17, which has an axial projection 17' for reception in opening 13. A spacer gasket 20 is interposed between members 12 and 14. In order to maintain the assembled members 12 and 14 in proper relation, a hollow dowel 21 fits snug within the registering openings 13 and 15.

A further embodiment of the invention is illustrated in Figure 5, wherein 22 is a gauging member which may be employed for gauging diameters of 2½" to 8" and which is composed of borosilicate or like glass. Member 22 is also of tubular character, having an axial opening 23. Screw 24 extends freely through opening 23 to secure the member 22 to handle 2, top plate 25 and bottom plate 26 overlying the adjacent surfaces of the member 22 as shown. Top plate 25 is drilled and tapped to act as a lock washer in the assembly. Gaskets 27 and 28 are interposed between the plates and member 22.

Figure 6 illustrates still another embodiment of the invention wherein the large diameter gauging member 29 is composed of borosilicate or like glass. The member 29 has a plurality of openings 30 extending therethrough. A shoe 31 is mounted on the forward face of member 29 as by means of a screw 32 extending through an opening 30 and plate 31'. A pair of handles 33 are mounted on the member 29 by means of bottom plates 34, top plates 35 and screws 36. Member 29 may be for instance of 8" to 12" in diameter.

It will be apparent that, in the case of each embodiment of the invention, the attaching means or metal screw utilized for attachment of the glass gauging member to the handle extends through an opening in the member but is not in contact with such member. Moreover, a free space exists between the attaching means and the gauging member. Thus, no problem arises due to unequal coefficients of expansion of different materials as would take place when the attaching means engages the gauging member or when a packing medium is utilized. An additional advantage flowing from the structure described resides in the freedom and ease of assembly and disassembly of the various parts.

It will be understood that the gauging member may be of tempered or untempered glass.

I claim:

1. A plug gauge comprising a plain-walled glass tube constituting a gauging member, a back plate seated on one end of said tube, a front plate seated on the other end of said tube, a handle having one end seated on said back plate and a threaded socket in said one end, and a screw extending through said plates and tube and into said socket, said tube having an annular free space therein defined by the interior wall surface of said tube and said screw and plates.

2. A plug gauge as defined in claim 1, each said plate having an axial projection extending a minor distance into said tube.

References Cited in the file of this patent

UNITED STATES PATENTS 1,514,250     Briney     Nov. 4, 1924

FOREIGN PATENTS 360,388     Germany     Oct. 2, 1922
568,926     Great Britain     Apr. 26, 1945